United States Patent
Ishai et al.

(10) Patent No.: US 11,565,327 B2
(45) Date of Patent: Jan. 31, 2023

(54) INDEXABLE PARTING BLADE WITH CIRCUITOUS COOLANT CHANNELS

(71) Applicant: ISCAR, LTD., Tefen (IL)

(72) Inventors: Yonatan Ishai, Misgav (IL); David Ben Harouche, Nahariya (IL)

(73) Assignee: Iscar, Ltd., Tefen (IL)

( * ) Notice: Subject to any disclaimer, the term of this patent is extended or adjusted under 35 U.S.C. 154(b) by 43 days.

(21) Appl. No.: 17/357,140

(22) Filed: Jun. 24, 2021

(65) Prior Publication Data

US 2021/0402485 A1 Dec. 30, 2021

Related U.S. Application Data

(60) Provisional application No. 63/046,050, filed on Jun. 30, 2020.

(51) Int. Cl.
*B23B 27/10* (2006.01)
*B23B 27/04* (2006.01)
(Continued)

(52) U.S. Cl.
CPC .............. *B23B 27/10* (2013.01); *B23B 27/04* (2013.01); *B23B 29/043* (2013.01);
(Continued)

(58) Field of Classification Search
CPC . B23B 27/10; B23B 27/04; B23B 2200/0471; B23B 2200/08;
(Continued)

(56) References Cited

U.S. PATENT DOCUMENTS 3,798,725 A * 3/1974 Hanson ................. B23B 29/043
82/158
9,259,788 B2 * 2/2016 Malka ..................... B23B 27/10
(Continued)

FOREIGN PATENT DOCUMENTS

DE  102014012481 A1 *  3/2016  ............ B22F 3/1055
DE  202018105949 U1     1/2020
(Continued)

OTHER PUBLICATIONS

International Search Report dated Oct. 13, 2021, issued in PCT counterpart application (No. PCT/IL2021/050755).
(Continued)

*Primary Examiner* — Sara Addisu
(74) *Attorney, Agent, or Firm* — Womble Bond Dickinson (US) LLP

(57) ABSTRACT

An indexable parting blade has opposite blade first and second sides, a blade peripheral edge, a central index axis, and at least first, second and third insert pockets located along the blade peripheral edge. The parting blade also has first, second and third coolant channels, each forming a coolant path from a corresponding inlet to a corresponding one of the insert pockets. Each coolant channel includes a rake outlet opening out to a rake side of its corresponding insert pocket and a relief outlet opening out to a relief side of that same insert pocket. The inlet corresponding to a given coolant channel is located further from that coolant channel's insert pocket than at least one of (a) the inlet corresponding to a different coolant channel, and (b) the central index axis.

24 Claims, 5 Drawing Sheets

(51) Int. Cl.
 *B23B 29/04* (2006.01)
 *B23Q 11/10* (2006.01)

(52) U.S. Cl.
 CPC ... *B23B 2200/0471* (2013.01); *B23B 2200/08* (2013.01); *B23B 2210/08* (2013.01); *B23B 2250/12* (2013.01); *B23Q 11/10* (2013.01)

(58) Field of Classification Search
 CPC ............... B23B 2250/12; B23B 27/08; B23B 2250/122; B23B 29/046; B23B 29/043; B23B 2210/08; B23Q 11/10
 See application file for complete search history.

(56) References Cited

U.S. PATENT DOCUMENTS

| | | | |
|---|---|---|---|
| 9,403,214 B2 | 8/2016 | Hecht | |
| 9,993,877 B2* | 6/2018 | Malka | B23B 27/10 |
| 10,029,312 B2* | 7/2018 | Thelin | B23B 27/10 |
| 10,343,222 B2* | 7/2019 | Schwagerle | B23B 27/086 |
| 10,661,352 B2* | 5/2020 | Kaufmann | B23B 27/083 |
| 2015/0063929 A1* | 3/2015 | Hecht | B23B 27/1625 407/67 |
| 2016/0339523 A1* | 11/2016 | Graf | B23B 29/043 |
| 2018/0326500 A1* | 11/2018 | Kaufmann | B23B 27/083 |
| 2019/0224760 A1* | 7/2019 | Amaya | B23C 5/28 |
| 2019/0240741 A1 | 8/2019 | Hecht et al. | |
| 2019/0366444 A1* | 12/2019 | Henzler | B23B 27/1677 |
| 2021/0220921 A1* | 7/2021 | Luik | B23B 29/043 |
| 2021/0299757 A1* | 9/2021 | Goeberl | B23B 27/086 |
| 2021/0402489 A1* | 12/2021 | Blabes | B23B 29/12 |

FOREIGN PATENT DOCUMENTS

| | | | | |
|---|---|---|---|---|
| EP | 3023179 A1 * | 5/2016 | | B23B 27/08 |
| JP | 2018-075677 A | 5/2018 | | |
| WO | WO-2018221162 A1 * | 12/2018 | | B23B 27/086 |

OTHER PUBLICATIONS

Written Opinion dated Oct. 13, 2021, issued in PCT counterpart application (No. PCT/IL2021/050755).

* cited by examiner

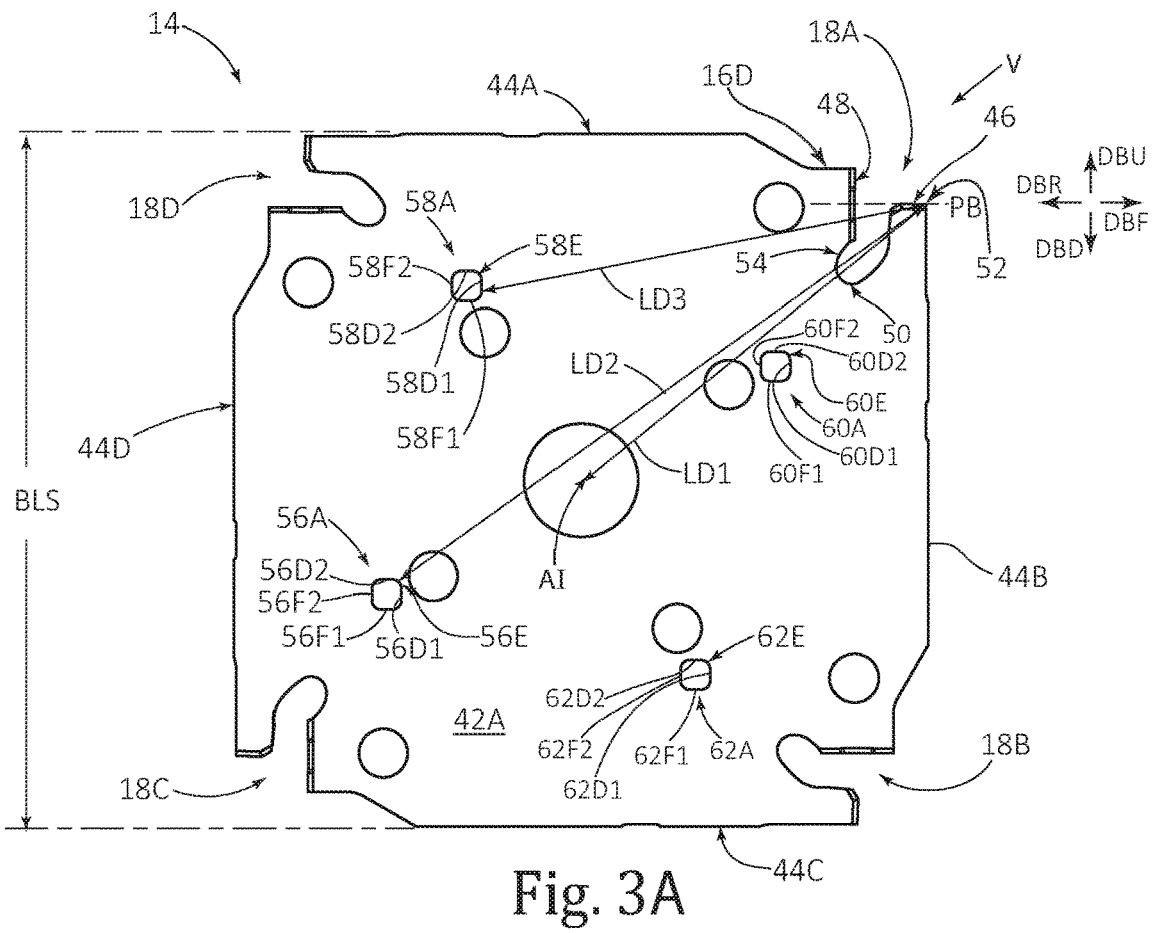
Fig. 3A
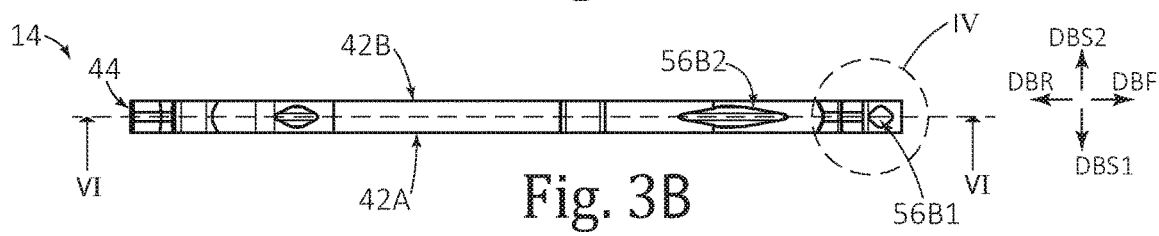
Fig. 3B
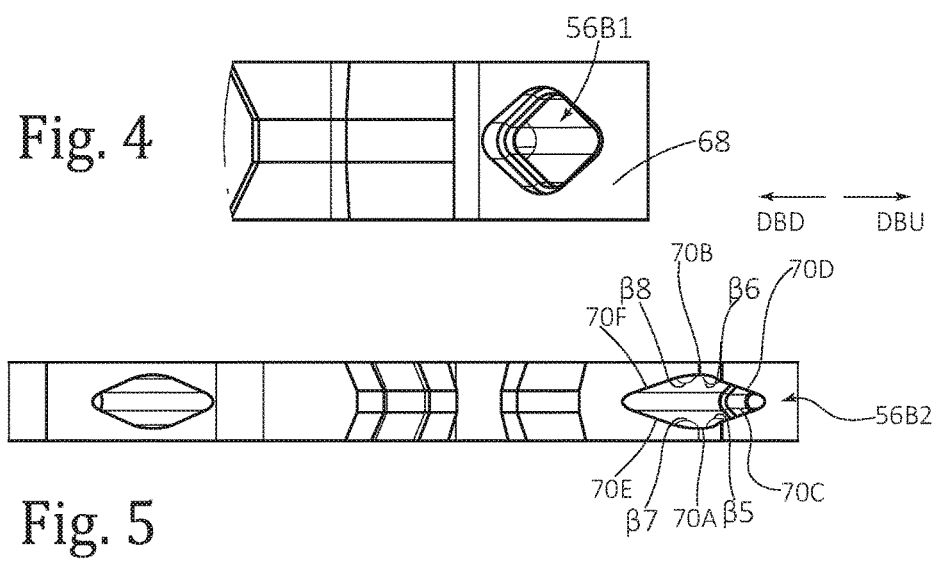
Fig. 4
Fig. 5

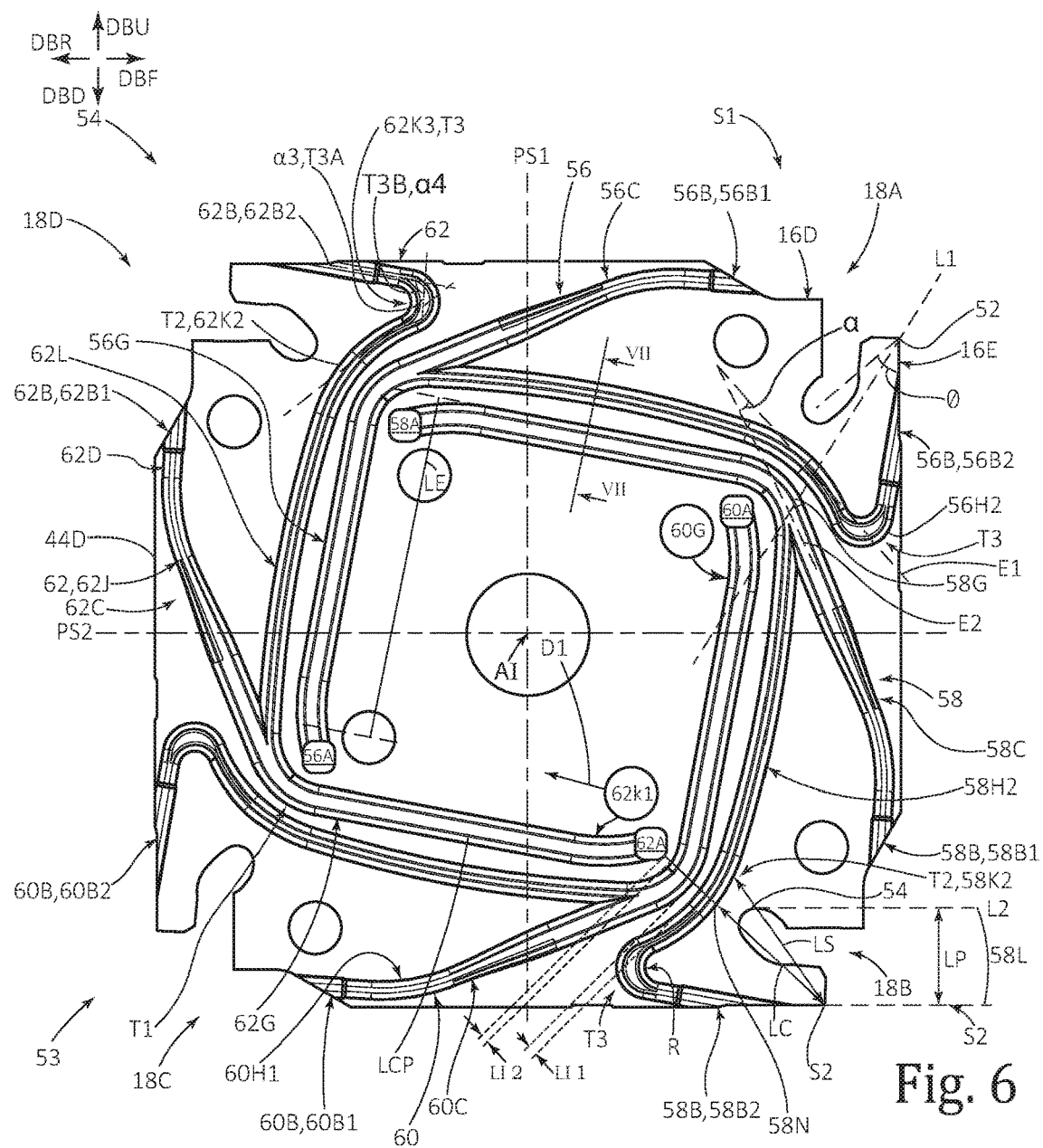
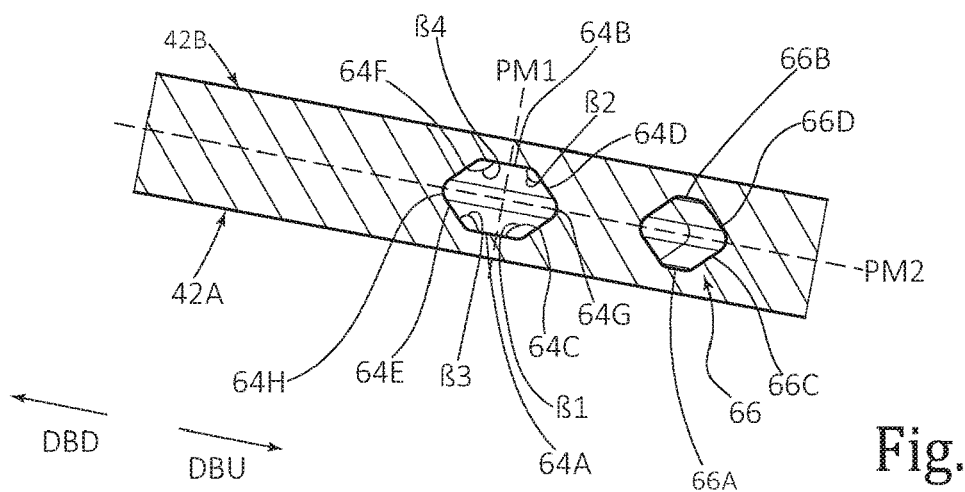
Fig. 6
Fig. 7

INDEXABLE PARTING BLADE WITH CIRCUITOUS COOLANT CHANNELS

RELATED APPLICATIONS

Priority is claimed to U.S. Provisional Patent Application No. 63/046,050, filed. Jun. 30, 2020. The contents of the aforementioned application are incorporated by reference in their entirety.

FIELD OF THE INVENTION

The subject matter of the present invention relates to an indexable parting blade (also referred to as "blade" hereinafter) and blade holder (also referred to as "holder" hereinafter), as well as a tool assembly comprising both the blade and holder, all of which are configured for parting. More particularly, the present invention relates to indexable parting blades having a plurality of coolant channels, each configured to supply coolant a corresponding insert pocket.

BACKGROUND OF THE INVENTION

As the name suggests, parting blades can be considered to have a 'blade' shape, meaning that they have a thin, knife or plate shape, for entering at a relatively large depth within a metal workpiece for parting operations. Stated differently, a blade thickness measured perpendicular to the first and second sides is by far the smallest dimension of the blade.

The most traditional, common, parting blades are elongated.

It will be understood that components configured for parting can be used for relatively smaller-depth grooving operations, however the converse may not be true in some cases.

Due to the difficulty in providing coolant to a cutting insert which is located within a thin slit (of a workpiece being parted), it has become common to provide a parting blade with internal coolant passages.

The present invention is an improvement of the Applicant's previous invention described in US 2019/0240741. While the invention is not limited to a four-way indexable parting blade shown in FIGS. 18B to 20B, and is certainly also applicable to, for example, at least the three-way indexable blade in FIG. 21A to 23D. The four-way indexable parting blade is mentioned because the coolant channel difficulty solved in the present application is mentioned with reference to the embodiment in FIGS. 18B to 20B.

With reference to that embodiment, there is described a rotatably symmetric parting blade and holder therefor. The blade comprises a single coolant channel per insert pocket. Each coolant channel comprising a blade inlet aperture and a blade outlet aperture.

The blade inlet aperture is preferably not located at a central index axis (or stated differently is spaced-apart from the central index axis) to allow a greater depth of cut for an indexable parting blade. It will be understood that while parting blades may appear visually similar to rotating slitting discs, the latter use all of their cutting inserts in a single operation and are not indexed in a holder to bring a new insert pocket into an active position for machining.

Notably, the blade outlet aperture is the only outlet aperture provided for the insert seat and is directed above the rake surface of a cutting insert held by the insert seat.

While it is known to provide two blade outlet apertures per insert seat in elongated parting blades, due to the four-way rotatable symmetry of the parting blade it was only found feasible to provide a single blade outlet aperture (and in some cases a single outlet aperture directed above the rake surface is the preferred embodiment as described in US 2013/0236253, assigned to the present applicant). It will be noted that more than one outlet aperture was not presented due to a number of difficulties which were overcome in the present invention.

One such difficulty, is that when there are several insert pockets and a blade inlet aperture associated with each pocket is located in a non-central location (or at least in a location which isn't in the same section of the blade as the blade outlet aperture, or adjacent thereto) the direct route of one channel from the blade inlet aperture to the blade outlet aperture is obstructed by another channel having a similar path.

Another difficulty is the lack of space required for additional coolant channels.

For the sake of good order, it will be noted that the present invention relates to coolant channels for an indexable parting blade, and features regarding other components and all non-coolant-related features disclosed in US 2019/0240741 are incorporated herein by reference.

It will be noted that various coolant channels are described in other publications.

U.S. Pat. No. 10,661,352 discloses a parting blade with three coolant channels for a single insert pocket.

Notably, U.S. Pat. No. 10,661,352 is an elongated parting blade (the most common shape parting blade nowadays) which does not have the same space constraints of the at least three-way or four-way indexable blades mentioned above in reference to US 2019/0240741 due to the larger structure and smaller number of insert pockets, and thus each insert pocket can easily be provided with two (or even three) blade outlet apertures associated with it.

It will be understood that the problems overcome by the present invention particularly occur in parting blades with a relatively high number of insert pockets for a given size blade. As can be seen, the parting blade disclosed in U.S. Pat. No. 10,661,352 does not have significant space-restraints relative to the number of coolant channels and elongated shape of the parting blade (since there is no difficulty of channels intersecting others in a direct path as there is in US 2019/0240741).

Yet another aspect of the present invention relates to an advantageous cross-sectional shape developed for the coolant channels produced by additive manufacturing, the shape being specifically advantageous for indexable parting blades.

In U.S. Pat. No. 10,661,352, while circular cross-sectional channels producible by traditional manufacturing methods are described in connection with most embodiments, it is noted that with additive manufacturing processes other cross sections such as polygonal or oval are possible.

Similarly, in DE 20 2018 105 949, a design showing an oval cross section is shown.

It is also known in the art of additive manufacturing to produce coolant channels with a teardrop shape (i.e. comprising a circular bottom edge and an upper upside-down v-shaped top edge, the purpose of the top edge being to reduce the top side falling during manufacture).

SUMMARY OF THE INVENTION

In accordance with a first aspect of the present invention, there is provided an indexable parting blade comprising:

opposing blade first and second sides;

a blade peripheral edge connecting the blade first and second sides;
a central index axis extending through the center of the blade first and second sides;
first, second and third insert pockets located along the blade peripheral edge; and
first, second and third coolant channels;
the first coolant channel comprising a first inlet, at least one first outlet opening out to the first insert pocket, and a first channel portion extending between the first inlet and the at least one first outlet;
the second coolant channel comprising a second inlet, at least one second outlet opening out to the second insert pocket, and a second channel portion extending between the second inlet and the at least one second outlet; and
the third coolant channel comprising a third inlet, at least one third outlet opening out to the third insert pocket, and a third channel portion extending between the third inlet and the at least one third outlet;
wherein:
the at least one first outlet comprises a first rake outlet opening out to a rake side of the first insert pocket and a first relief outlet opening out to a relief side of the first insert pocket; and
the first inlet is located further from a furthermost point of the first insert pocket than at least one of (a) the second inlet and (b) the central index axis.

The present invention allows, for the first time, two outlets at a single insert pocket, despite the space constrictions of having at least three-way indexability. This also taking into account that a preferred large parting depth is possible since the first inlet is relatively distanced from the at least one first outlet.

For the sake of good order, it will be pointed out that other aspects recited below are advantageous even without being restricted to at least three-way indexability (or stated differently, at least three insert pockets, preferably but optionally equally spaced around a central index axis). Nonetheless, it will be understood that said aspects below may also advantageously have three-way indexability (i.e. three insert pockets) or more.

One way that the first inlet can be distanced further from a furthermost point of the first insert pocket than the second inlet. Thus even though the second inlet and the associated second coolant channel will obstruct a direct path to at least one of the two outlets of the first coolant channel, the preferred relatively large parting depth can be achieved. Stated differently, the second coolant channel can obstruct a direct path from the first inlet to at least one of the at least one first outlets.

Alternatively, or additionally, the first inlet can be distanced further from a furthermost point of the first insert pocket than a central index axis extending through the center of the blade first and second sides, similarly allowing a relatively large parting depth to be achieved.

It will be understood that it is extremely difficult or impractical to have multiple turns for a coolant path (which subsequently require plugging at drill entry holes etc.) using traditional machining methods. The present invention utilizes a nested coolant channel configuration.

While having multiple coolant channels extending parallel or basically parallel, especially under an insert pocket's base jaw where the main force of machining is applied, runs the risk of overly weakening the blade's construction, testing found the exemplified design to be sufficiently strong for the parting operation.

In accordance with a second aspect of the present invention, there is provided an indexable parting blade comprising:
opposing blade first and second sides;
a blade peripheral edge connecting the blade first and second sides;
first and second insert pockets located along the blade peripheral edge; and
first and second coolant channels;
the first coolant channel comprising:
a first inlet;
at least one first outlet opening out to a first insert pocket;
a first channel portion extending from the first inlet to the at least one first outlet opening;
the second coolant channel comprising:
a second inlet;
at least one second outlet opening out to the second insert pocket;
a second channel portion extending from the second inlet to the at least one second outlet opening;
wherein a channel path of the first channel portion comprises:
a first position proximate to the first inlet, where the channel path extends in a first direction which is more towards the first insert pocket than away therefrom;
a second position further along the channel path from the first inlet than the first position, where the channel path extends in a second direction more away from the first insert pocket than towards it; and
a third position further along the channel path from the first inlet than the second position, where the channel path extends in a third direction more towards the first insert pocket than away from it.

It will be understood from the drawings, that in the constricted area available, a sharp turn is needed for the coolant channel to both bypass other obstructing coolant channels and be directed to the relevant cutting zone (i.e. at the workpiece or cutting insert).

It will be understood that prior known coolant channels typically only have at most a slightly larger than a 90° turn. This is because a sharper turn causes a more severe pressure drop, which is disadvantageous and therefore is known to be avoided.

It will be understood that the sharp turn defined in the second or third aspect could alternatively be defined as a U-shaped turn. Drawing imaginary lines along the two arms of the U-shape at the final turn portion leading into the third position, the sharp turn forms an acute angle $\alpha 0$ which fulfills the condition: $\alpha 0 < 80°$, preferably $\alpha 0 < 70°$, more preferably $\alpha 0 < 60°$ and even more preferably $\alpha 0 < 50°$, since the latter value leaves the most compact form (desirable for constricted space but not for coolant flow). Nonetheless, to reduce pressure drop, it is still preferred that $\alpha 0 > 20°$, more preferably $\alpha 0 > 30°$.

Nonetheless, it was deemed that such pressure drop would still provide more coolant to a cutting insert or workpiece than an absence of an entire coolant outlet. Additionally, to offset said pressure drop an enlarged cross section at the sharp turn was developed, as described below.

It is also, as mentioned above, more difficult to produce a sharp turn (the present turn can really be considered two closely spaced significant turns) in traditional manufacturing methods (e.g. since multiple plugging operations, such as welding, would also be needed).

While the example shown in the drawings shows the sharp turn underneath the insert pocket (i.e. relating to the sub-channel providing coolant to the relief side of the pocket), the channels could be oppositely nested (not shown) for the sharp turn to alternatively occur at the rake side of the pocket. In other words, the channels could extend from the inlets in a counterclockwise direction instead of the clockwise direction exemplified (still bypassing an adjacent (in a rotational sense) coolant inlet by extending between the adjacent coolant inlet and the blade peripheral edge before subsequently reaching an insert pocket). Even though the preferred example shown has the sharp turn at the relief side of the insert pocket which is more concerning with respect to cutting forces, it is preferred that there be a more effective coolant supply at the rake side of and insert pocket and hence this arrangement is preferred. Nonetheless, the oppositely nested arrangement is also a feasible possibility.

In another way that the invention can be expressed, is by the high number of significant turns the path takes.

According to a third aspect of the present invention, there is provided an indexable parting blade comprising:
opposing blade first and second sides;
a blade peripheral edge connecting the blade first and second sides;
first and second insert pockets located along the blade peripheral edge; and
first and second coolant channels;
the first coolant channel comprising:
a first inlet;
at least one first outlet opening out to a first insert pocket;
a first channel portion extending from the first inlet to the at least one first outlet opening;
the second coolant channel comprising:
a second inlet;
at least one second outlet opening out to the second insert pocket;
a second channel portion extending from the second inlet to the at least one second outlet opening;
wherein a channel path of the first channel portion comprises:
a first significant turn forming a channel part first angle $\alpha 1$ fulfilling the condition: $25°<\alpha 1<155°$;
a second significant turn forming a channel part second angle $\alpha 2$ fulfilling the condition: $25°<\alpha 2<155°$;
a third significant turn forming a channel part third angle $\alpha 3$ fulfilling the condition: $25°<\alpha 3<155°$; and
a fourth significant turn forming a channel part fourth angle $\alpha 4$ fulfilling the condition: $25°<\alpha 4<155°$, wherein:
along the channel path, the second significant turn is downstream from the first significant turn, the third significant turn is downstream from the second significant turn, and the fourth significant turn is downstream from the third significant turn.

It will be understood from the above that in this aspect the final "sharp turn" or "U-turn" can alternatively be defined as two adjacent significant turns ("significant turns" in the present application being defined as forming an angle of greater than 25°, preferably greater than 45°, and less than 155°).

Between the adjacent turns, there can be a continuous curved connection.

Unlike the large turns shown in the prior art, the sharp turn can have an extremely small radius of curvature R of less than 5 mm (R<5 mm), preferably R<3.5 mm and most preferably, R<2 mm. It will be understood that these preferences are beneficial only due to the need to deal with space constraints and are not beneficial from a pressure drop perspective.

The channel part first angle $\alpha 1$ preferably fulfills the condition: $70°<\alpha 1<130°$, preferably $80°<\alpha 1<120°$, more preferably $90°<\alpha 1<110°$.

The channel part second angle $\alpha 2$ preferably fulfills the condition: $110°<\alpha 2<155°$, preferably $125°<\alpha 2<150°$, more preferably $130°<\alpha 2<150°$.

The channel part third angle $\alpha 3$ preferably fulfills the condition: $90°<\alpha 3<155°$, preferably $105°<\alpha 3<140°$, more preferably $115°<\alpha 3<135°$.

The fourth channel angle $\alpha 4$ preferably fulfills the condition: $70°<\alpha 4<130°$, preferably $80°<\alpha 4<120°$, more preferably $90°<\alpha 4<110°$.

As shown in FIG. 6 of US 2019/0240741, a total cutting force FC on a cutting insert and consequently an insert pocket holding the cutting insert is directed more in a downward direction than a rearward direction.

As will be understood, one way to achieve provision of coolant to both sides of an insert pocket for a constricted-space indexable parting blade, it was necessary to provide multiple closely layered coolant channels even underneath the insert pocket where said force is directed.

Thus, in accordance with a fourth aspect of the present invention, there is provided an indexable parting blade comprising:
opposing blade first and second sides;
a blade peripheral edge connecting the blade first and second sides; and
first and second insert pockets located along the blade peripheral edge;
the first insert pocket located along the blade peripheral edge and comprising a base jaw, a second jaw opposing the base jaw, and a slot end connecting the base jaw and the second jaw;
the base jaw defines a base plane and has a forwardmost point distal from the slot end;
the base plane defines:
a rearward direction defined from the forwardmost point toward the blade;
a forward direction opposite to the rearward direction;
an upward direction perpendicular to the forward and rearward directions and away from the base jaw and the blade; and
a downward direction opposite to the upward direction; and wherein:
a force angle range $\theta$ has an apex at the forwardmost point, and is defined between the downward direction and the rearward direction, and fulfills the condition: $50°>\theta>10°$; and
an imaginary oblique line L1 extending from the forwardmost point within the force angle range $\theta$ intersects at least two coolant channels.

As will be understood, due the above concerns of weakening an already thin parting blade, an alternative definition, not with respect to the force angle, but location of multiple coolant paths relative to an insert pocket is similarly counterintuitive (with increasing proximity to the insert pocket being even more counterintuitive).

Thus, in accordance with a fifth aspect of the present invention, there is provided an indexable parting blade comprising:
opposing blade first and second sides;
a blade peripheral edge connecting the blade first and second sides; and
first and second insert pockets located along the blade peripheral edge;

the first insert pocket located along the blade peripheral edge and comprising a base jaw, a second jaw opposing the base jaw, and a slot end connecting the base jaw and the second jaw;

the base jaw defines a base plane and has a forwardmost point distal from the slot end;

the base plane defines:
 a rearward direction defined from the forwardmost point toward the blade;
 a forward direction opposite to the rearward direction;
 an upward direction perpendicular to the forward and rearward directions and away from the base jaw and the blade; and
 a downward direction opposite to the upward direction;

and wherein:
 the first insert pocket has a rearwardmost point; and
 in exactly the downward direction between a first imaginary downward line L2 extending from the rearwardmost point and forward from the first imaginary downward line L2, there is defined an area comprising at least two different coolant channels.

During development of the indexable parting blade of the present invention, an advantageous coolant channel cross-sectional shape was developed.

In accordance with a sixth aspect of the present invention, there is provided an indexable parting blade comprising:
 opposing blade first and second sides;
 a blade peripheral edge connecting the blade first and second sides;
 first and second insert pockets located along the blade peripheral edge; and
 a first coolant channel;

the first coolant channel comprising:
 a first inlet;
 at least one first outlet opening out to the first insert pocket;
 a channel portion extending from the first inlet to the at least one first outlet opening;

wherein:
 at least a portion of the channel portion comprises a cross-sectional shape comprising:
  opposing first and second side-edges extending along the blade first and second sides;
  a first straight upper-edge extending from the first side-edge at a first obtuse angle β1 internal to the channel portion;
  a second straight upper-edge extending from the second side-edge at a second obtuse angle β2 internal to the channel portion;
  a first straight lower-edge extending from an opposing side of the first side-edge to the first upper-edge, at a third obtuse angle β3 internal to the channel portion;
  a second straight lower-edge extending from an opposing side of the second side-edge to the second upper-edge, at a fourth obtuse angle β4 internal to the channel portion;
  the first and second upper-edges connecting at an upper corner-edge; and
  the first and second lower-edges connecting at a lower corner-edge.

While a teardrop shaped coolant channel is known, i.e. having converging straight upper-edges to reduce collapsing of an upper side of a coolant channel, the present shape also allows for the same effect even with multiple coolant channels in which there is no clear upper edge due to the greatly turning path. While the channel could be changed at different portions thereof, it is preferred for the cross-sectional shape to remain uniform, at least over a majority of the channel, to avoid pressure drop to the greatest extent possible.

In the publications mentioned above, an oval shape was also used. While such shape would perhaps provide a greater cross-sectional area than the above defined shape, and one would think that this would provide better coolant flow, it has been found that the straight upper and lower edges may be even more beneficial since the surface finish of the channels was found to be improved over an upper or lower curved edge, thus the straight edges were preferred even with the reduced cross-sectional area (relative to an oval shape).

Preferences for the cross-sectional shape are as follows.

The first and second side-edges extend parallel with the blade first and second sides.

The first and second side-edges are each longer than each of the first and second upper-edges.

The first and second side-edges are each longer than each of the first and second lower-edges.

The cross-sectional shape is elongated in a direction parallel to the bladed first and second sides.

The cross-sectional shape is mirror-symmetric about a first mid-plane perpendicular to and extending through the middle of the first and second side-edges.

The cross-sectional shape is mirror-symmetric about a second mid-plane parallel to and extending through the middle of the first and second side-edges.

The channel portion has the defined cross-sectional shape along a majority thereof.

A second coolant channel comprising a second inlet, at least one second outlet opening out to the second insert pocket, and a second channel portion extending between the second inlet to the at least one second outlet; the second channel portion has the defined cross-sectional shape along a majority thereof.

The third coolant channel comprising a third inlet, at least one third outlet opening out to the third insert pocket, and a third channel portion extending between the third inlet to the at least one third outlet; the third channel portion has the defined cross-sectional shape along a majority thereof.

At the at least one first outlet, the cross-sectional shape of the first outlet comprises shorter first and second side-edges than a previous part of the channel portion.

At the at least one first outlet, the cross-sectional shape of the first outlet comprises shorter first and second side-edges than the first and second upper-edges.

At the at least one first outlet, the cross-sectional shape of the first outlet comprises shorter first and second side-edges than the first and second lower-edges.

Notably the outlet preferences even further reduce coolant flow over an oval shape, yet are desirable for structural strength purposes.

The upper and lower corner-edges are concavely-shaped.

A further related development was made for indexable parting blades in terms of an oriented inlet shape. To simplify production, allow printing without regard to a particular indexable orientation all of the inlets were similarly oriented.

Thus, in accordance with a seventh aspect of the present invention, there is provided an indexable parting blade comprising:
 opposing blade first and second sides;
 a blade peripheral edge connecting the blade first and second sides;

first, second and third insert pockets located along the blade peripheral edge; and first, second and third coolant channels;

the first coolant channel comprising a first inlet, at least one first outlet opening out to the first insert pocket, and a first channel portion extending between the first inlet to the at least one first outlet;

the second coolant channel comprising a second inlet, at least one second outlet opening out to the second insert pocket, and a second channel portion extending between the second inlet to the at least one second outlet; and the third coolant channel comprising a third inlet, at least one third outlet opening out to the third insert pocket, and a third channel portion extending between the third inlet to the at least one third outlet;

wherein:

the first, second and third inlets open out to one or both of the blade first and second sides and each inlet comprise a pair of converging, straight upper inlet-edges, all of which are oriented in the same direction.

While it was preferred that other apertures in the blade's first and second sides were preferred, but are not limited to, circular cross-sectioned shapes, as shown, there was no such consideration required for the inlets, as they do not require a screw to extend therethrough.

While all of the inlets could have comprises a standard tear-drop shape, the four-way straight edged polygon (stated differently, 45° rotated square) was preferred for a four-way indexable blade. Similarly, a triangular shape (preferably equilateral) is preferred for a three-way indexable blade.

Referring again to the sharp turn mentioned in the second and third aspects, an advantageous way to compensate for the restriction to fluid flow has been developed.

Namely, in accordance with an eighth aspect of the present invention, there is provided a parting blade comprising:

opposing blade first and second sides;

a blade peripheral edge connecting the blade first and second sides;

at least first a first insert pocket; and a first coolant channels;

the first coolant channel comprising a first inlet, at least one first outlet opening out to the first insert pocket, and a first channel portion extending between the first inlet to the at least one first outlet;

wherein:

the first channel portion comprises a curved turn preceded by a preceding channel part and succeeded by a succeeding channel part;

wherein a turn cross-sectional area measured perpendicular to the coolant path through the curved turn is greater than a preceding channel part cross-sectional area measured perpendicular to the coolant path through the preceding channel part.

Thus the enlarged cross section at the curved compensates for the detriment of the sharp turn.

Preferably, the turn cross-sectional area can also be greater than a succeeding channel part cross-sectional area measured perpendicular to the coolant path through the succeeding channel part.

Generally speaking, it will be understood that the present invention is directed to parting blades which have a single active insert pocket during a machining operation and not rotating tools which use a plurality of cutting inserts during a given operation.

In accordance with an ninth aspect of the present invention, there is provided an indexable parting blade comprising: opposing blade first and second sides; a blade peripheral edge connecting the blade first and second sides; a central index axis (AI) extending through the center of the blade first and second sides; at least first, second and third insert pockets located along the blade peripheral edge, and at least first, second and third coolant channels, each coolant channel forming a channel path from an associated inlet to a corresponding one of the insert pockets, and each coolant channel comprising a rake outlet opening out to a rake side of its corresponding insert pocket, a relief outlet opening out to its corresponding insert pocket, and channel parts connecting its associated inlet to the rake and relief outlets; wherein: in a cross-section of the parting blade taken between the first and second sides, an imaginary radial line (LR) extending from the center axis (A1) to any part of the blade peripheral edge, intersects at least two of the coolant channels.

Thus, in accordance with a tenth aspect of the present invention, there is provided a tool assembly comprising an indexable parting blade according to any one of the previous aspects and a blade holder configured to hold the parting blade such that only one of the insert pockets of the parting blade is positioned for active use.

The blade holder may any of the features known in prior art blade holders and most preferably is of the type described in US 2019/0240741.

While the main inventive features of the present invention have been described in separate aspects above, it will be understood that a combination of any of the main inventive features (as exemplified in the drawings) is also possible.

In summary of the main features, a parting blade according to the present invention can have one or more of: (a) the first inlet being located relatively distant from a furthermost point of an insert pocket; (b) a sharp turn; (c) more than one coolant channel in the path of the cutting force or, alternatively, underneath an insert pocket; (d) at least one, and preferably all, channel portion cross-sectional shapes comprising straight converging straight upper and lower edges; (e) all inlets having a straight converging straight upper edges oriented in the same direction.

Preferred features for all of the aspects above will now be described.

It will be understood that there is more applicability of the present invention, while not being restricted thereto, for a non-elongated regular shaped, e.g. triangular, square and so forth. Stated differently the parting blade can be indexable about a central index axis extending through the center of the first and second sides thereof. However, it will be understood that the present invention is applicable to any parting blade without ample space for desired coolant channels. For example, one clear case where the present invention may be beneficial to an elongated rectangular (standard shaped) parting blade is where the parting blade has four insert pockets and therefore requires a relatively large number of coolant channels.

Similarly, as the invention is more applicable in space-constricted blades, it will be understood that there is more applicability for three-way indexable blades (i.e. with three insert pockets) than for a two-way indexable blades. This is for a similar reason, in that a blade with three insert pockets requires more space for coolant channels than a blade of similar size with two insert pockets. In the same way, the present invention is more advantageous in four-way indexable blades than three-way indexable blades and so forth.

For indexability, the insert pockets are preferably equally angularly spaced about the peripheral edge of the parting blade.

Since the invention is more applicable in space-constricted blades, it will be understood that for extremely large blades, there is less need for such invention. However merely increasing blade size is problematic because CNC machines have limited space and an increased blade size either requires a larger blade holder or a larger overhang, both of which are disadvantageous. Nonetheless, to provide some quantitative perspective, an imaginary circumscribing circle C, in a side view of the blade, has a diameter D fulfilling the condition: D<90 mm, preferably D<80 mm, more preferably D<70 mm and most preferably D<60 mm.

Similarly, the sharp turn is particularly applicable within a close distance to the associated insert pocket. To provide some perspective, an insert pocket length LP can be defined from a forwardmost point to a rearwardmost point thereof. From the forwardmost point the second position (where the channel starts to extends in a second direction more away from the first insert pocket than towards it) is within a second position length LS fulfilling the condition: LS<3LP, preferably LS<2LP, and most preferably LS<1.5LP. Alternatively defined, in a quantitative manner, the second position length LS can fulfill the condition: LS<15 mm, preferably LS<10 mm, and most preferably LS<7.5 mm.

Similarly, the constricted space for a coolant channel or number of coolant channels within a close distance to the associated insert pocket can be defined as follows. From the forwardmost point to a closest point of a closest coolant channel there is defined a closest length LC fulfilling the condition: LC<3LP, preferably LC<2LP, and most preferably LC<1.5LP. Alternatively defined, in a quantitative manner, the closest length LC can fulfill the condition: LC<15 mm, preferably LC<10 mm, and most preferably LC<7.5 mm.

From the closest channel to the insert pocket to an adjacent channel, an intermediary distance LI (measured along the same line from the forwardmost point to the closest point of the closest coolant channel, but only starting on the other side of the coolant channel from the closest point and extending to the closest point of the adjacent channel) can fulfill the condition: LI<LP, preferably LI<0.5LP, and most preferably LI<0.25LP. Alternatively defined, in a quantitative manner, the intermediary length LI can fulfill the condition: LI<5 mm, preferably LI<2.5 mm, and most preferably LI<1.25 mm.

In the previous paragraphs, different ways (the overall size of the parting blade, the channel or sharp turn proximity to the insert pocket, etc.) to explain the space constrictions of a parting blade relative to the coolant channels has been described.

Yet another way to define the constricted space is regarding the indexability of the parting blade. An indexable parting blade, according to any of the aspects, can be divided into imaginary sectors S. The sectors S are defined as equal in number to the number of insert pockets N of the parting blade (S=N). The sectors are defined by designating imaginary sector planes PS through the central index axis IA at an angular spacing equal to 360°/S, the planes being equally spaced between the insert pockets. Thus, for example, a square parting blade with four equally spaced insert pockets at each corner will be divided by two imaginary perpendicular sector planes into four basically square sectors at each corner in a side view. A further example would be a triangular parting blade with three equally spaced insert pockets at each corner will be divided into three sectors at each corner. When considering a two-way indexable shape (two insert pockets) such as a traditional elongated parting blade with two equally spaced insert pockets (i.e. located at diagonally opposite pockets) there will be two sectors. However, in the latter example the single imaginary sector plane between the two insert pockets could be drawn lengthwise along the elongation of the blade or perpendicular to the elongation of the blade (in a side view of the main surfaces). In such cases the orientation of the imaginary sector plane for the purposes of the present invention should be chosen as the option where the sector plane extends closer to the insert pocket than would occur in the alternative orientation. The reason for this is that it results in sectors which are more constricted at least at one side of the insert pocket making it more difficult for coolant channels to extend along that side (and hence more applicability for the present invention). Accordingly, for said traditional elongated blade, the imaginary sector plane extends parallel with the direction of elongation of the blade.

In preferred embodiments a coolant channel's inlet is located in a different sector to the at least one outlet thereof.

In preferred embodiments a coolant channel's sharp turn (or U-turn) is entirely located in the same sector as the at least one outlet thereof. Alternatively defined, in preferred embodiments a coolant channel's second and third position is entirely located in the same sector as the at least one outlet thereof. Alternatively defined, in preferred embodiments a coolant channel's significant third and fourth turn is entirely located in the same sector as the at least one outlet thereof.

In preferred embodiments, at least two different channels (i.e. starting at different inlets) extend alongside each other. This is due to the constricted area available. The extension (LE) of the two basically parallel portions of the two different channels can be at least 10% of the corresponding length of the blade's side BLS (i.e. the length of the blade parallel with the extension of the parallel portions), such that the following condition is fulfilled: LE>0.1LS. Preferably, LE>0.3LS, and most preferably LE>0.5LS.

The outermost channel (i.e. the channel closer to the blade's peripheral edge) can then turn adjacent to a similar turn of the innermost channel (basically in the direction towards the insert pocket to which the innermost channel has an outlet associated therewith). The outermost channel can then turn again to be redirected back to the insert pocket to which it has an outlet channel associated with.

In preferred embodiments, the imaginary oblique line L1 intersects the at least two coolant channels within the same sector as the associated insert pocket.

In preferred embodiments, in exactly the downward direction between a first imaginary downward line L2 extending from the rearwardmost point and forward from the first imaginary downward line L2, there is defined an area comprising at least two different coolant channels.

Regarding the force angle range θ, it will be understood that the exact direction of a force on the cutting insert changes with relative movement of a cutting insert entering a workpiece. Nonetheless, it is generally directed as defined above (i.e. between the downward direction at the forwardmost point to towards the rearward direction and fulfills the condition: 50°>θ>10°). Nonetheless, the position of the at least two channels could more precisely be defined within the condition: 40°>θ>15°, or even more precisely 30°>θ>15°.

It will be understood that with space constraints, the imaginary oblique line L1 can preferably intersect at least three coolant channels or at least even four coolant channels.

Regarding the channels intersecting either the imaginary oblique line L1 or the first imaginary downward line L2, it is preferred that at least two adjacent channels extend in the same basic direction at the point of intersection. Stated differently, it is preferred that the at least two adjacent channels extend basically parallel with each other at the intersection area. Stated differently, the adjacent channels at the intersection can have imaginary extension lines E1, E2 extending parallel to the coolant path at the intersection and forming an angle γ fulfilling the condition: γ<45°, preferably γ<30° and most preferably γ<15°.

While in the example shown, there is a central hole shown for non-coolant purposes, it is noted that, while the opposite is still an option, in preferred embodiments the coolant inlets be formed separately from the central hole (and hence do not open out to an inner edge of the central hole).

In preferred embodiments, a coolant channel comprises a single initial channel part which then divides into a plurality of subsequent channel parts. It will be understood that a single initial channel part needs less space than two parallel channel portions, and therefore this configuration is preferred. Preferably, the initial channel part has a length LCP more than 20% of the overall length LOC of the coolant channel from the inlet to the closest outlet thereof (LCP>0.2LOC), more preferably, LCP>0.4LOC. Nonetheless, it is preferred that the subsequent channel parts comprise terminal linear portions to direct coolant appropriately. Accordingly, the division is preferably not extremely close to the outlets. Thus it is preferred that: LCP<0.8LOC, and more preferred that LCP<0.65LOC.

More precisely each one of the two subsequent channel parts can extend from the initial channel part to an at least one outlet opening. The at least one outlet opening can be a rake outlet opening out to a rake side of an insert pocket and a relief outlet opening out to a relief side of the same insert pocket. The subsequent channel part extending to the rake outlet can be called a rake channel part. The subsequent channel part extending to the relief outlet can be called a relief channel part.

While any blade shape is possible, it is preferred that the peripheral edge of the blade, in a side view of the blade (e.g. FIG. 3A), comprise straight abutment portions for stable mounting.

While any insert pocket is feasible, even one which utilizes a clamp or screw, for thin parting blades it is preferred that a resilient insert pocket is used which is generally narrower than the prior mentioned types. The resilient insert pockets can be any known configuration. Typically, each insert pocket herein can comprise a base jaw (i.e. located below the cutting insert, or stated differently, on an opposite side of the cutting insert to a rake surface of the cutting insert), and a second jaw. The second jaw exemplified in the drawings herein extends behind the cutting insert and can be defined as located rearward the base jaw. Another known configuration is where the second jaw is located upward of the base jaw.

The blade may comprise further insert pockets. For example, a fourth insert pocket located along the blade peripheral edge; and a fourth coolant channel forming a channel path from an associated inlet to the fourth insert pocket.

Regarding the inlets, it is preferred that they comprise an inlet reservoir larger in cross section than the subsequent channel portion.

Regarding the portion of the channel adjacent to the outlets it is preferred that they comprise a terminal linear portion to ensure the coolant continues the desired path after exiting the blade.

Each of the features described above in relation to the first coolant channel can further be applied to one or more of the other coolant channels, preferably all of the other coolant channels.

The coolant channels can be similar or identical for each insert pocket.

As a general note, while any turn in a coolant channel could be measured on either side thereof (e.g. on one side the angle could be 150° and measured on the other side the reflex angle would be 210°) it should be noted that all angles for turns mentioned in the specification should be measured at the side which is less than 180°.

BRIEF DESCRIPTION OF THE DRAWINGS

For a better understanding of the subject matter of the present application, and to show how the same may be carried out in practice, reference will now be made to the accompanying drawings, in which:

FIG. 3A is a side view of the parting blade shown in FIG. 1A;

FIG. 3B is an end view of the parting blade shown in FIG. 3A;

FIG. 4 is an enlarged view of the portion designated "IV" in FIG. 3B;

FIG. 5 is an enlarged view corresponding to a direction designated "V" in FIG. 3A;

FIG. 6 is a section view along line VI-VI in FIG. 3B (even though the traditional hash lines are not shown for ease of visibility);

FIG. 7 is an enlarged section view along line VII-VII in FIG. 6.

DETAILED DESCRIPTION

Figure 1A:
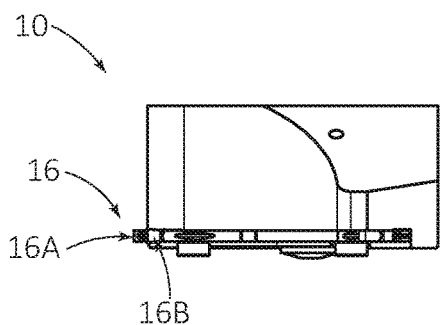
FIG. 1A is a front view of a parting tool assembly according to the present invention.

Referring to FIGS. 1A to 2E, the tool assembly 10 comprises a tool holder 12 and a parting blade 14 mounted to the tool holder 12, and is configured to hold a single cutting insert 16 in an active first insert pocket 18A (referring to FIG. 3A, in this example the parting blade 14 comprises first, second, third and fourth insert pockets 18A, 18B, 18C, 18D, wherein the first insert pocket 18A is the active one).

The tool holder 12 comprises an elongated tool shank 19 having a shank axis AS defining forward and rearward tool directions DTF, DTR.

Perpendicular to the forward and rearward tool directions DTF, DTR are upward and downward tool directions DTU, DTD.

Perpendicular to the forward, rearward, upward and downward tool directions DTF, DTR, DTU, DTD are first side and second side tool directions DTS1, DTS2.

The tool holder 12 further comprises a tool head 20 which comprises a blade pocket 22 (FIG. 2C) to which the parting blade 14 is clamped via first and second screws 24A, 24B.

The tool head 20 can also typically comprise a concave front surface 26. It will be understood that a workpiece (not shown) cannot be parted to a depth greater than that defined by the curvature of the concave front surface 26. Nonetheless the concave front surface 26 provides structural support to the thin parting blade 14.

The blade pocket 22 comprises a holder peripheral wall 28 (the abutment surfaces of which are a rear wall portion 28A and a bottom wall portion 28B) which extend in the first side tool direction DTS1 from a pocket side surface 30 of the blade pocket 22.

The pocket side surface 30 is formed with a holder coolant outlet 32 for providing coolant from the holder 12 to the blade 14.

The pocket side surface 30 can further be formed with an o-ring recess 36, a threaded seal-bore 34, and an o-ring (not shown) mounted in the o-ring recess 36 and surrounding the holder coolant outlet 32 and seal-bore 34.

Figures 1B, 1C, 1D:
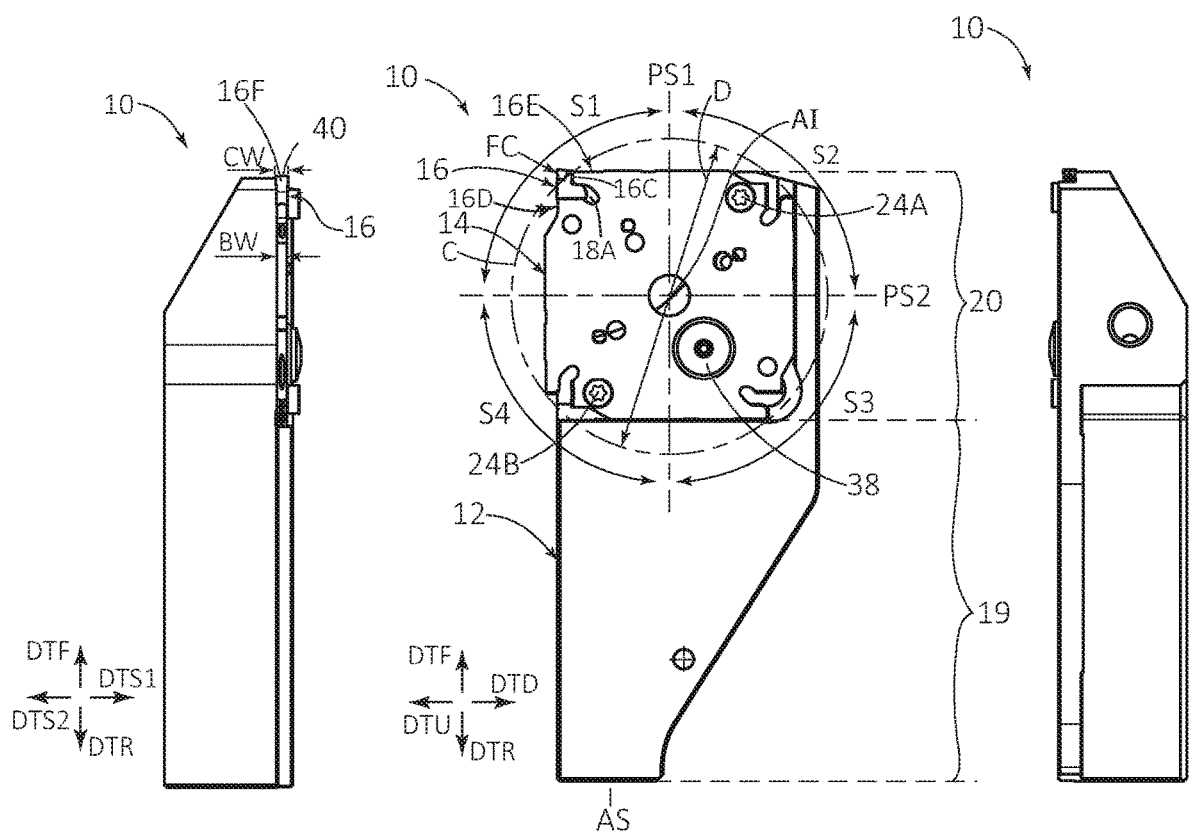
FIG. 1B is a top view of the tool assembly in FIG. 1A.
FIG. 1C is a side view of the tool assembly in FIG. 1A.
FIG. 1D is a bottom view of the tool assembly in FIG. 1A.
Figure 1E:
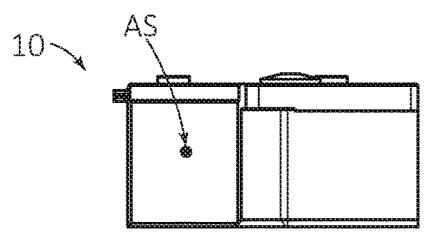
FIG. 1E is a rear view of the tool assembly in FIG. 1A.
Figure 2A:
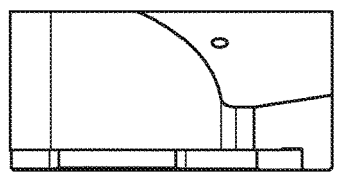
FIG. 2A is a front view of a blade holder shown in FIG. 1A.
Figure 2B:
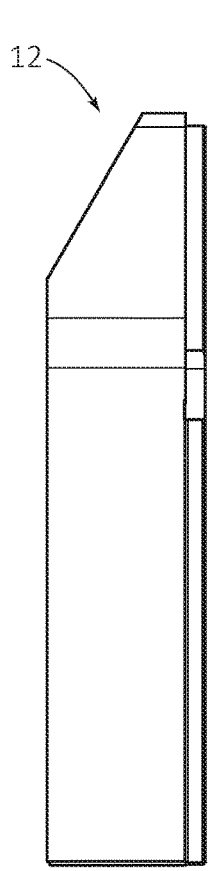
FIG. 2B is a top view of the blade holder in FIG. 2A.
Figure 2C:
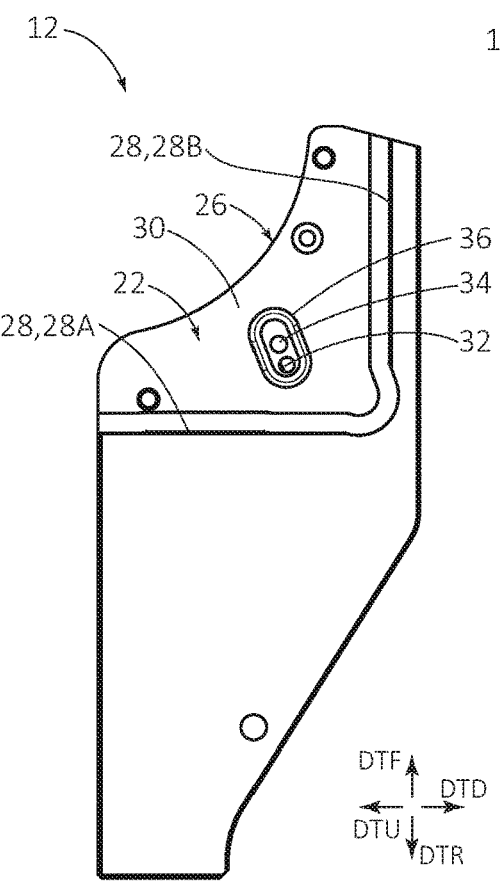
FIG. 2C is a side view of the blade holder in FIG. 2A.
Figure 2D:
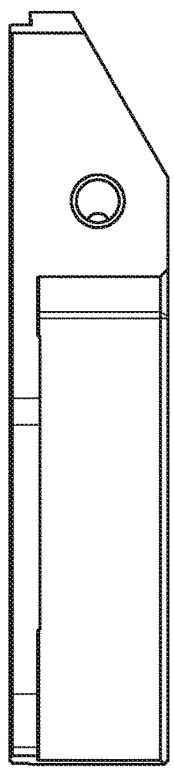
FIG. 2D is a bottom view of the blade holder in FIG. 2A.
Figure 2E:
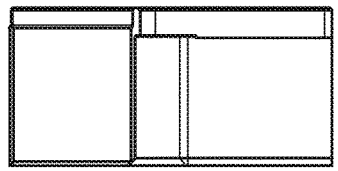
FIG. 2E is a rear view of the blade holder in FIG. 2A.

Reverting to FIG. 1C, a threaded seal element 38 can extend through the blade 14 and be secured to the seal-bore 34 to prevent coolant exiting the holder 12 from simply passing through a blade's inlet (not shown in FIG. 1C) from the holder coolant outlet 32.

As noted in FIG. 1A, the cutting insert 16 comprises a rake surface 16B and a front relief surface 16A extending downwards therefrom (as well as side relief surfaces, e.g. one side relief surface designated 16C shown in FIG. 1C). Accordingly, the first insert pocket 18A has a rake side 16D located adjacent to the rake surface 16B, or alternatively defined, located adjacent or upward thereof. The first insert pocket 18A also has a relief side 16E adjacent the front relief surface 16B or alternatively defined, located downward of the rake surface 16A.

Preferably the cutting insert 16 is formed with a chip forming construction 16F (FIG. 1B).

As noted in FIG. 1B, the cutting insert's cut width CW of the cutting edge 40 thereof is wider than the blade's blade width BW.

A total cutting force FC is schematically shown with an arrow on the cutting insert 16 such force being applied by the workpiece on the insert 16 and consequently continuing in basically on the blade 14 in the downward tool direction DTD and the rearward tool direction DTR (more in the downward tool direction DTD than rearward tool direction DTR).

Notably, if a construction comprising the holder coolant outlet 32 would extend further in one or both of the forward tool direction DTF and the upward tool direction DTU, than the concave front surface 26 then this would reduce cut depth capability of the tool assembly 10 since a workpiece would be impeded by any projection extending past the concave front surface 26. Accordingly, it is preferred that an inlet (e.g. first inlet 58A shown in FIG. 3A) for the blade 14 be non-centrally located. Conversely, if the shown holder coolant outlet 32 would be positioned to provide coolant to the center of a blade (not shown) the overall size of the blade would be smaller than that shown, thereby reducing the depth capability thereof. It will be understood that this is, nonetheless, an option and therefore certain aspects of the present invention are not limited to a non-centrally located blade inlet. Nonetheless, a non-centrally located blade inlet (spaced further from an active insert pocket) has the advantages mentioned above.

The above description of a tool holder 12 and accessories (screws, seals etc.) is similar to those described in US 2019/0240741 and further details are provided there, and are incorporated herein by reference.

Referring to FIGS. 3A and 3B, exemplary features of the present invention, will now be described in connection with the exemplary blade 14 shown in the drawings.

The parting blade 14 comprises first and second side surfaces 42A, 42B, and a blade peripheral edge 44.

The blade peripheral edge 44 comprises first, second, third and fourth peripheral sub-edges 44A, 44B, 44C, 44D extending between the first, second, third and fourth insert pockets 18A, 18B, 18C, 18D. A maximum distance between opposing peripheral sub-edges defines a length of the blade's side BLS.

Preferably the peripheral sub-edges 44A, 44B, 44C, 44D comprise straight bearing surfaces (i.e. as shown in the side view of the parting blade, such as FIG. 1C).

The exemplary parting blade 14 shown, has a regular shape, which in this case is a basic square shape. An imaginary circumscribing circle C, shown in FIG. 1C, touches the blade peripheral edge 44 of the blade 14, the imaginary circumscribing circle C has a diameter D.

The parting blade 14 is rotationally symmetrical about a central index axis AI. More precisely, the four-way indexable parting blade 14 is 90° rotationally symmetric.

Accordingly, to ease explanation, features of the coolant paths and insert pockets and all other features may be described in reference to one part of the blade merely for ease of visibility, but it should be understood that each rotationally symmetric corresponding part also comprises the same feature.

It will be however understood that while the coolant channels of the present example are identical, small deviations in path are also possible (especially with the flexibility of additive manufacturing, also referred to as 3D printing) and therefore there is no importance for them to be perfectly identical. Also, as seen in FIG. 6 discussed below, the coolant channels follow a circuitous path from their respective inlets to their respective insert pockets to which coolant is supplied.

The first insert pocket 18A comprises a base jaw 46, a second jaw 48 and a slot end 50.

The base jaw 46 defines a base plane PB and comprises a forwardmost point 52 distal from the slot end 50.

A rearward blade direction DBR is defined along the base plane PB from the forwardmost point 52 toward the blade 14. In this non-limiting example, the rearward blade direction DBR is more particularly directed toward that portion of blade behind the associated second jaw 48. Relative to the rearward blade direction DBR are defined forward, upward and downward blade directions DBF, DBU, DBD (all arbitrarily defined in this example relative to the first insert pocket 18A).

In the rearward blade direction DBR from the forwardmost point 52, a rearwardmost point 54 is defined, in this example at the slot end 50, however for a different insert pocket type this may not be the case.

Referring now to FIG. 6, an exemplary internal coolant construction will be described.

First, second, third and fourth coolant channels 56, 58, 60, 62 are shown.

For ease of visibility only some features will be described relative to other coolant channels but should be understood to apply to each and every coolant channel.

The first coolant channel 56 comprises a first inlet 56A, at least one first outlet 56B opening out to the first insert pocket 18A, and a first channel portion 56C extending from the first inlet 56A to the at least one first outlet 56B (in this case designated 56B1). To clarify, the first channel portion 56C is the entire extension of the first coolant channel 56 extending between the first inlet 56A and the at least one first outlet 56B, 56B1 thereof.

To elaborate, in the shown example, the at least one first outlet 56B comprises a first rake outlet 56B1 opening out to the rake side 16D of the first insert pocket 18A, and a first relief outlet 56B2 opening out to a relief side 16E of the first insert pocket 18A.

Similarly: the second coolant channel 58 comprises a second inlet 58A, at least one second outlet 58B (in this example being a second rake outlet 58B1 and a second relief outlet 58B2) opening out to the second insert pocket 18B, and a second channel portion 58C; the third coolant channel 60 comprises a third inlet 60A, at least one third outlet 60B (in this example being a third rake outlet 60B1 and a third relief outlet 60B2) opening out to the third insert pocket 18C, and a third channel portion 60C; and the fourth coolant channel 62 comprises a fourth inlet 62A, at least one fourth outlet 62B (in this example being a fourth rake outlet 62B1 and a fourth relief outlet 62B2) opening out to the fourth insert pocket 18D, and a fourth channel portion 62C.

Reverting to FIG. 3A, it will be understood that both externally and internally the first, second, third and fourth inlets 56A, 58A, 60A, 62A each inlet comprises a pair of converging, straight upper inlet-edges 56D1, 56D2, 58D1, 58D2, 60D1, 60D2, 62D1, 62D2, all of which are oriented in the same direction. Namely, the first inlet 56A comprises a first pair of converging straight upper inlet-edges 56D1, 56D2; the second inlet 58A comprises a second pair of converging straight upper inlet-edges 58D1, 58D2; the third inlet 60A comprises a third pair of converging straight upper inlet-edges 60D1, 60D2; and the fourth inlet 62A comprises a fourth pair of converging straight upper inlet-edges 62D1, 62D2. To elaborate regarding the direction, in the present example each pair converges in the combined upward blade direction DBU and forward blade direction DBF. To elaborate, the first, second, third and fourth inlets 56A, 58A, 60A, 62A each comprise an apex (namely a first apex 56E, second apex 58E, third apex 60E and fourth apex 62E at the juncture of each pair of the straight upper inlet-edges 56D1, 56D2, 58D1, 58D2, 60D1, 60D2, 62D1, 62D2.

In this example the first, second, third and fourth inlets 56A, 58A, 60A, 62A are four-way straight-edged polygons each further comprising a pair of converging, straight lower inlet-edges 56F1, 56F2, 58F1, 58F2, 60F1, 60F2, 62F1, 62F2. Namely, the first inlet 56A comprises a first pair of converging straight lower inlet-edges 56F1, 56F2; the second inlet 58A comprises a second pair of converging straight lower inlet-edges 56F1, 56F2; the third inlet 60A comprises a third pair of converging straight lower inlet-edges 56F1, 56F2; and the fourth inlet 62A comprises a fourth pair of converging straight lower inlet-edges 56F1, 56F2.

It will be understood that the blade 16 is preferably printed (i.e. during additive manufacturing) in an orientation which is 45° to the orientation shown in FIG. 3A, and advantageously any of the first, second, third and fourth insert pockets 18A, 18B, 18C, 18D could be the uppermost insert pocket during printing.

Using as an example, the first coolant channel's first inlet 56A is located further from the furthermost point 52 of the first insert pocket 18A than the central index axis AI (the length from the furthermost point 52 to the central index axis AI being designated as LD1). This allows a further depth of cut for the blade 14 than if the first blade inlet 56A were located at the central index axis AI, and in the latter case, the maximum parting depth (as limited by the holder 12), would have been the length LD1 (or even smaller since the blade inlet has an area). In the example shown, the parting depth is closer to the length LD2 (albeit somewhat smaller due to the holder 12 construction; the length from the furthermost point 52 to the first inlet 56A being designated as LD2). Regardless, the parting depth capability of the blade 14 is greater than the length LD1.

Similarly, it will be noted that the first inlet 56A is located further from the furthermost point 52 of the first insert pocket 18A than the second inlet 58A, i.e., the second inlet 58A is closer to the furthermost point 52 than the first inlet 56A. This allows the same greater depth advantage as described above (a length LD3 from the furthermost point 52 to the second inlet 58A being significantly smaller than the parting depth possible for the blade 14), but such construction provides a further advantage of the nested coolant channel arrangement shown (i.e. the channels encircling each other to arrive at a desired insert pocket without being obstructed by another coolant channel). Indeed, as seen in FIG. 3A, the first inlet 56A is located further from the furthermost point 52 of the first insert pocket 18A than all the other inlets 58A, 60A, 62A.

Figure 6B:
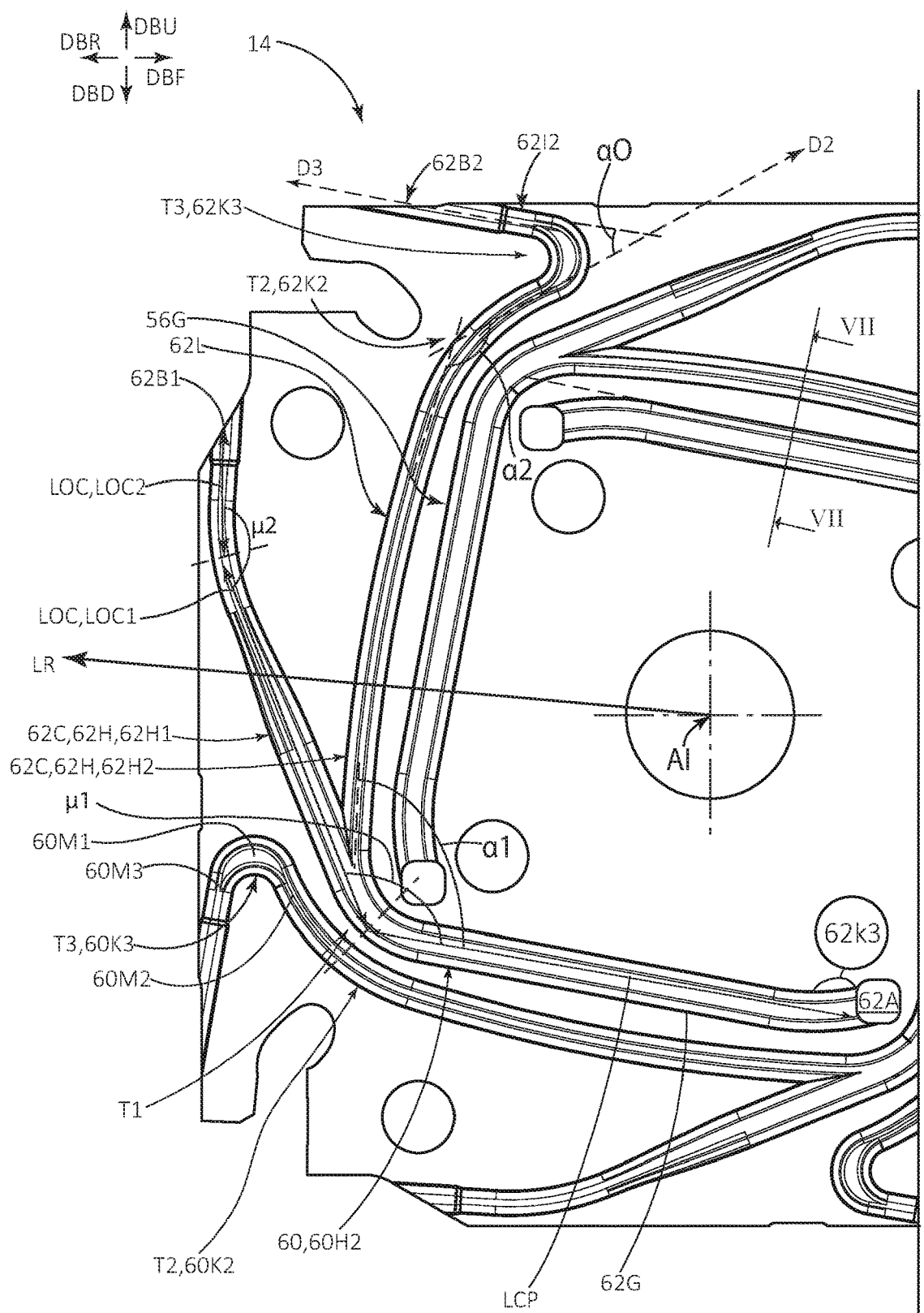
FIG. 6B is a portion of the section view shown in FIG. 6 (even though the traditional hash lines are not shown for ease of visibility)

Reverting now to FIG. 6, the first coolant channel 56 extends in a clockwise direction encircling around the outside of at least a portion of the second coolant channel 58. Similarly, the second coolant channel 58 extends in a clockwise direction, encircling around the outside of the third coolant channel 60, and so forth. Thus, as seen in FIG. 6B, in a cross-section of the blade taken between the first and second side surfaces 42A, 42B, an imaginary radial line LR extending from the center axis AI to any part of the blade peripheral edge 44, intersects at least two of the coolant channels. As mentioned above, said encirclement or nesting could have alternatively been in the counter-clockwise direction.

Referring also to FIG. 6B, using the fourth coolant channel 62 as an example, it will be noted that the fourth channel portion 62C can comprise a single initial channel part 62G which divides into a plurality of subsequent channel parts 62H (the subsequent channel parts in this example comprising a first subsequent channel part 62H1 connected to the fourth rake outlet 62B1, and a second subsequent channel part 62H2 connected to the fourth relief outlet 62B2).

The initial channel part 62G has a length LCP (measured from the edge of the fourth inlet 62A to the start of the first turn T1 of the fourth channel portion 62C). Notably, and advantageously, the initial channel part length LCP is quite significantly long, since the alternative of fitting two parallel channels (not shown) in the same congested area would be relatively more problematic in the constricted space available (i.e. if there would be completely separate channels from the fourth inlet 62A to the respective fourth rake outlet 62B1 and fourth relief outlet 62B2).

Nonetheless, to provide coolant to two sides of the fourth insert pocket, the fourth channel portion 62C is divided into said two subsequent channel parts 62H1, 62H2.

The shorter of two subsequent channel parts 62H, which in this example is the first subsequent channel part 62H1, defines a length LOC which is schematically shown as the sum of a first subsequent channel part first sector length LOC1 and a first subsequent channel part second sector length LOC2.

It will be further noted that advantageously, both the first subsequent channel part 62H1 and the second subsequent channel part 62H2 have respective first and second terminal linear portions 62l1, 62l2 adjacent and opening out to the fourth rake outlet 62B1 and to the fourth relief outlet 62B2.

Referring now also to FIG. 6, regarding a channel path (generally designated as "62J") of the fourth coolant channel 62, it is first noted that the initial channel part 62G extends, from a first position 62K1 (taking into account the major basic path of the initial channel part 62G and not a minor portion 62K3 (FIG. 6B) exiting the fourth inlet 62A extending in a slightly different direction) proximate to the fourth inlet 62A, in a first direction D1 which is more towards the fourth insert pocket 18D than away therefrom. To clarify, the first direction D1 extends in a combination of the rearward blade direction DBR and the upward blade direction DBU.

Regarding the fourth coolant channel's first subsequent channel part 62H1, at the location where the initial channel part 62G divides into the two subsequent channel parts 62H1, 62H2, there is a significant first turn T1 of the fourth coolant channel 62. In the present context, a "significant turn" between two adjoining sections of a coolant path is one that undergoes at least a 25° turn (i.e. ≥25°).

At the significant first turn T1, the fourth coolant channel's first subsequent channel part 62H1 has a non-sharp turn (i.e. the turn is greater than 90°, even greater than 110°, and in this example forms a first channel part first angle $\mu1$ of 123°, as measured with adjacent straight lines drawn as dashed lines through straight portions of the fourth channel portion 62C, the forthcoming angles will be measured in a similar manner) and a second smaller turn (in this example a first channel part second angle $\mu2=155°$) leading to the first terminal linear portion 62l1.

More notably, at the significant first turn T1 of the fourth coolant channel 62, regarding the fourth coolant channel's second subsequent channel part 62H2, which is the channel part located further from the blade's fourth peripheral sub-edge 44D than the first subsequent channel part 62H1, the significant first turn T1 is sharper (i.e. the turn is far less than 110°, even less than 100°, and in this example forms a second channel part first angle $\alpha1$ of 96°).

It will be understood that since the channel part first angle $\alpha1$ is smaller than the first channel part first angle $\mu1$, this will cause relatively more pressure drop in the second subsequent channel part 62H2 than in the first subsequent channel part 62H1.

Notably, the second subsequent channel part 62H2 has a first sub-channel part 62L extending adjacent to and parallel with the first coolant channel's initial channel part 58G.

The fourth coolant channel's first sub-channel part 62L and the first coolant channel's initial channel part 58G extend adjacent to and parallel with one another for a significant length (called herein "extension LE" (shown in FIG. 6) and measured along where the two parts are parallel).

Subsequently, at a second position 62K2 which also comprises a significant second turn T2 of the fourth coolant channel (when considering the continued coolant path along the second subsequent channel part 62H2), the channel path extends in a second direction D2 more away from the fourth insert pocket 18D than towards it. To clarify, the second direction D2 extends in a combination of the forward blade direction DBF and the upward blade direction DBU. At this position there is the significant second turn T2, at which a channel part second angle $\alpha2$ is 139°).

Subsequently, at a third position 62K3 which also comprises a sharp third turn T3 of the fourth coolant channel 62, the channel path extends in a third direction D3 more towards from the fourth insert pocket 18D than away from it. A sharp turn acute angle $\alpha0$ is formed between a straight portion immediately subsequent to the second position 62K2 and subsequent to the third position 62K3 and constitutes an extremely sharp turn T3 with an acute angle $\alpha0$ of 42°.

Rather than using said dashed lines, an alternate definition for the sharp turn angle, referring briefly to the corresponding portion of the second coolant channel, can be defined in terms of a radius R (FIG. 6; for ease of visibility, designated adjacent to the second relief outlet 58B2).

For ease of visibility, the description of the identical construction now will be continued with reference to the second subsequent channel 60H2 of the third coolant channel 60 as shown in the bottom left corner of FIG. 6B. To compensate for the extremely sharp turn T3, an enlarged cross section of the second subsequent channel 60H2 is shown in the area between the second position 60K2 and the third position 60K3 and designated as 60M1 (in this example the area shown is a curved turn 60M1 between the second position 60K2 and the third position 60K3).

More precisely, the curved turn 60M1 is preceded by a preceding channel part 60M2 and succeeded by a succeeding channel part 60M3, the latter two parts being straight.

Reverting to the fourth coolant channel 62 as shown in FIG. 6, defining the third turn T3 differently, the so-called "sharp turn" can be considered as two adjacent significant sub-turns, namely first and second sub-turns T3A, T3B.

The first sub-turn T3A has a channel part third angle $\alpha3$ of 125°.

The second sub-turn T3B has a channel part fourth angle $\alpha4$ of 100°.

For ease of visibility, the description will be continued with reference to the area of the second insert pocket 18B in FIG. 6. To provide perspective of the proximity of the sharp third turn T3 to an insert pocket (referring briefly to the second insert pocket 18B and the second coolant channel 58 adjacent thereto), it can be noted that the sharp turn starts at the second position 58K2 (or second turn T2). A distance of an insert pocket length LP and a second position length LS measured from the forwardmost point 52 to the second position 62K2 are relatively similar (by relatively similar, it is meant that the second position length LS is less than twice the size of insert pocket length LP).

Similarly, an alternative definition of this proximity can be a closest length LC between the forwardmost point 52 and a closest point 58N of a closest coolant channel (which in the example shown is the second coolant channel's second subsequent channel part 58H2).

A first intermediary distance LI1 between the two coolant channels closest to the second insert pocket 18B (along the line shown extending to the to the closest point 58N) is shown and is 0.8 mm.

A second intermediary distance LI2 between the second closest coolant channel (which in the example shown is the third coolant outlet's single initial channel part 60G) and the third closest coolant channel (which in the example shown is the fourth coolant outlet's single initial channel part 62G) is shown and is 1 mm.

Stated differently, the distance between adjacent coolant channels is about equal to, or smaller than, the cross-sectional dimension of the coolant channels themselves. In other words, the coolant channels are closely positioned relative to each other.

As seen best in FIG. 1C, the parting blade 14 can be divided into equal sectors, specifically in this example, first, second, third and fourth sectors S1, S2, S3, S4, which is this instance, can be considered "quadrants".

Referring now to FIG. 6 and the first coolant channel 56, the first inlet 56A thereof being located in the third sector S3, it will be noted that the entire sharp turn thereof is within the first sector S1.

Notably, the third inlet 60A is also within the first sector S1, yet the third outlets 60B are in the third sector S3.

A force angle range θ, having an apex at the forwardmost point 52, is exemplified with respect to the first insert pocket 18A.

Force applied from the workpiece during machining thereof is transferred first to the cutting insert (FIG. 1C) and then to an insert pocket. Since the exact direction of the force changes due to various variables, the defined force angle range is an approximation used for purposes of illustrating forces relative to the blade 14.

In FIG. 6, an imaginary oblique line L1 has been drawn from the forwardmost point 52 and within the force angle range θ to show that it intersects three coolant channels (namely the first coolant channel's second subsequent channel part 56H2, the second coolant channel's initial channel part 58G and the third coolant channel's initial channel part 60G). As further shown along these intersected coolant channels, a first imaginary extension line E1 extends through the first coolant channel's second subsequent channel part 56H2, and a second imaginary extension line E2 extends through the second coolant channel's initial channel part 58G. The first and second extension lines E1, E2 have been drawn extending parallel to their respective coolant paths at the point of intersection of the oblique line L1, and are seen to form an extension line angle γ between themselves.

Reverting to the area 58L, shown for example relative to the second insert pocket 18B, said area 58L is defined between a first imaginary downward line L2 and the rearwardmost point 54. The area 58L when considering the area in exactly the downward direction between the two (relative to the insert pocket of course, noting that the downward direction for the second insert pocket 18B as shown in the present drawing is the designated rearward blade direction DBR), in the present example comprises two coolant channels in the area defined (namely the second coolant channel's second subsequent channel part 58H2 and the third coolant channel's first subsequent channel part 60H1).

Referring to FIG. 7, a first cross-sectional shape 64 of the second coolant channel 58 along the initial channel part 58G thereof is shown.

Additionally, a second cross-sectional shape 66 of the first coolant channel 56 along the second subsequent channel part 56H2 thereof is shown.

Regarding the first cross-sectional shape 64, it comprises: opposing first and second side-edges 64A, 64B; a first straight upper-edge 64C extending from the first side-edge 64A at a first obtuse angle β1 internal to the channel portion; a second straight upper-edge 64D extending from the second side-edge 64B at a second obtuse angle β2 internal to the channel portion; a first straight lower-edge 64E extending from an opposing side of the first side-edge 64A at a third obtuse angle β3 internal to the channel portion; a second straight lower-edge 64F extending from an opposing side of the second side-edge 64B, at a fourth obtuse angle β4 internal to the channel portion; the first and second upper-edges 64C, 64D connect at an upper corner-edge 64G which is concavely-shaped; and the first and second lower-edges 64E, 64F connecting at a lower corner-edge 64H which is concavely-shaped.

Notably, while the first and second side-edges 64A, 64B are each longer than each of the first and second upper-edges 64C, 64D, for the first cross-sectional shape, the first and second side-edges 66A, 66B of the second cross-sectional shape 66 are substantially the same length as first and second upper-edges 66C, 66D of the second cross-sectional shape. While a more elongated shape would have been preferred for coolant flow, due to space constraints this was not provided. It will be understood that the cross section of the first cross-sectional shape 64 and second cross-sectional shape 66 could have been swapped. However, it is preferable that an initial channel part of a coolant channel have a greater cross sectional area than the plurality of subsequent channel parts, since the coolant is to be divided among the subsequent channel parts.

Both the first and second cross-sectional shapes 64, 66 are elongated in the blade upward and downward directions DBU, DBD.

The first cross-sectional shape 64 is mirror-symmetric about a first mid-plane PM1 perpendicular to and extending through the middle of the blade's first and second side-edges 42A, 42B.

The first cross-sectional shape 64 (and also the second cross-sectional shape 66) is mirror-symmetric about a second mid-plane PM2 parallel to and extending through the middle of the blade's first and second side-edges 42A, 42B.

Reverting to FIG. 4, it will be noted that the first rake outlet 56B1 has been reduced in the previously elongated cross sectional area to a basically square shape (rotated 45° relative to the upward and downward directions DBU, DBD, and thus also referred to as a "diamond shape"). While there is room for the first rake outlet to be more elongated, thereby desirably increasing the cross sectional area, a less elongated outlet allows greater constructional strength of the area thereabove (noting the substantial provision of material 68 above the first rake outlet 56B1).

Alternatively, to provide similar strength, at the first relief outlet 56B2 shown in FIG. 5 the shape thereof is still elongated to provide significant cross sectional area and hence coolant flow. However, an elongated diamond shape is provided. Stated differently, the first relief outlet 56B2 now comprises shorter first and second side-edges 70A, 70B (which are basically concavely curved side edges) than the previous first cross-sectional shape 64 near the start of first coolant channel 58 as shown in FIG. 7. This shortening is similarly, to provide greater constructional strength at the area thereabove but to provide additional coolant flow. To describe the first relief outlet's diamond shape, the first relief outlet 56B2 comprises shorter first and second side-edges 70A, 70B than the first and second upper-edges 70C, 70D and shorter first and second side-edges 70A, 70B than the first and second lower-edges 70E, 70F. In such case it is preferred that the first, second, third and fourth obtuse angles β5, β6, β7, β8 all fall within the range of: 120°<β5, β6, β7, β8<170°, more preferably 130°<β5, β6, β7, β8<160°.

What is claimed is:
1. An indexable parting blade comprising:
opposing blade first and second sides;
a blade peripheral edge connecting the blade first and second sides;
a central index axis extending through the center of the blade first and second sides;

first, second and third insert pockets located along the blade peripheral edge; and first, second and third coolant channels;

the first coolant channel comprising a first inlet, at least one first outlet opening out to the first insert pocket, and a first channel portion extending between the first inlet and the at least one first outlet;

the second coolant channel comprising a second inlet, at least one second outlet opening out to the second insert pocket, and a second channel portion extending between the second inlet and the at least one second outlet; and the third coolant channel comprising a third inlet, at least one third outlet opening out to the third insert pocket, and a third channel portion extending between the third inlet and the at least one third outlet;

wherein:

the at least one first outlet comprises a first rake outlet opening out to a rake side of the first insert pocket and a first relief outlet opening out to a relief side of the first insert pocket; and the first inlet is located further from a furthermost point of the first insert pocket than at least one of (a) the second inlet and (b) the central index axis.

2. The indexable parting blade according to claim 1, wherein the second coolant channel obstructs a direct path from the first inlet to at least one of the at least one first outlets.

3. The indexable parting blade according to claim 1, wherein the first inlet is located further from the furthermost point of the first insert pocket than both the second inlet and the central index axis.

4. The indexable parting blade according to claim 1, wherein the first inlet is located further from the furthermost point of the first insert pocket than all other inlets of the parting blade.

5. The indexable parting blade according to claim 1, wherein a channel path of the first channel portion comprises:

a first position proximate to the first inlet, where the channel path extends in a first direction which is more towards the first insert pocket than away therefrom;

a second position further along the channel path from the first inlet than the first position, where the channel path extends in a second direction more away from the first insert pocket than towards it; and a third position further along the channel path from the first inlet than the second position, where the channel path extends in a third direction more towards the first insert pocket than away from it.

6. The indexable parting blade according to claim 1, wherein at least the first coolant channel undergoes a sharp turn proximate to the first relief outlet opening, the sharp turn defining an acute turn angle $\alpha 0$.

7. The indexable parting blade according to claim 6, wherein the sharp turn is U-shaped and the acute angle $\alpha 0$ fulfills the condition: $80°<\alpha 0<20°$.

8. The indexable parting blade according to claim 7, wherein the sharp turn fulfills the condition: $70°<\alpha 0<30°$.

9. The indexable parting blade according to claim 6, wherein the sharp turn has a radius of curvature R fulfilling the condition R<5 mm.

10. The indexable parting blade according to claim 9, wherein the sharp turn has a radius of curvature R fulfilling the condition R<3.5 mm.

11. The indexable parting blade according to claim 1, wherein all of the parting blade's channels are nested and either all extend from their respective inlets in a clockwise direction or, alternatively, all extend from their respective inlets in a counterclockwise direction.

12. The indexable parting blade according to claim 1, wherein a channel path of the channel portion comprises:

a first significant turn forming a channel part first angle $\alpha 1$ fulfilling the condition: $25°<\alpha 1<155°$;

a second significant turn forming a channel part second angle $\alpha 2$ fulfilling the condition: $25°<\alpha 2<155°$;

a third significant turn forming a channel part third angle $\alpha 3$ fulfilling the condition: $25°<\alpha 3<155°$; and a fourth significant turn forming a channel part fourth angle $\alpha 4$ fulfilling the condition: $25°<\alpha 4<155°$, wherein:

along the channel path, the second significant turn is downstream from the first significant turn, the third significant turn is downstream from the second significant turn, and the fourth significant turn is downstream from the third significant turn.

13. The indexable parting blade according to claim 12, wherein the channel part first angle $\alpha 1$ fulfills the condition: $70°<\alpha 1<130°$.

14. The indexable parting blade according to claim 12, wherein the channel part second angle $\alpha 2$ fulfills the condition: $110°<\alpha 2<155°$.

15. The indexable parting blade according to claim 12, wherein the channel part third angle $\alpha 3$ fulfills the condition: $90°<\alpha 3<155°$.

16. The indexable parting blade according to claim 12, wherein the channel part fourth angle $\alpha 4$ fulfills the condition: $70°<\alpha 4<130°$.

17. The indexable parting blade according to claim 1, wherein:

the first insert pocket comprises a base jaw, a second jaw opposing the base jaw, and a slot end connecting the base jaw and the second jaw;

the base jaw defines a base plane and has a forwardmost point distal from the slot end;

the base plane defines:

a rearward direction defined from the forwardmost point toward the blade;

a forward direction opposite to the rearward direction;

an upward direction perpendicular to the forward and rearward directions and away from the base jaw and the blade; and a downward direction opposite to the upward direction;

and wherein:

a force angle range $\theta$ has an apex at the forwardmost point, and is defined between the downward direction and the rearward direction, and fulfills the condition: $50°>\theta>10°$; and an imaginary oblique line L1 extending from the forwardmost point within the force angle range $\theta$ intersects at least two coolant channels.

18. The indexable parting blade according to claim 1, wherein:

the first insert pocket comprises a base jaw, a second jaw opposing the base jaw, and a slot end connecting the base jaw and the second jaw;

the base jaw defines a base plane and has a forwardmost point distal from the slot end;

the base plane defines:

a rearward direction defined from the forwardmost point toward the blade;

a forward direction opposite to the rearward direction;

an upward direction perpendicular to the forward and rearward directions and away from the base jaw and the blade; and a downward direction opposite to the upward direction; and wherein:

the first insert pocket has a rearwardmost point; and in exactly the downward direction between a first imaginary downward line (L2) extending from the rearwardmost point and forward from the first imaginary downward line (L2), there is defined an area comprising at least two different coolant channels.

19. The indexable parting blade, according to claim 1, wherein:

at least a portion of the first channel portion has a cross-sectional shape comprising:

opposing first and second side-edges extending along the blade first and second sides;

a first straight upper-edge extending from the first side-edge at a first obtuse angle β1 internal to the channel portion;

a second straight upper-edge extending from the second side-edge at a second obtuse angle β2 internal to the channel portion;

a first straight lower-edge extending from an opposing side of the first side-edge to the first upper-edge, at a third obtuse angle β3 internal to the channel portion; and a second straight lower-edge extending from an opposing side of the second side-edge to the second upper-edge, at a fourth obtuse angle β4 internal to the channel portion; wherein:

the first and second upper-edges connect at an upper corner-edge; and the first and second lower-edges connect at a lower corner-edge.

20. The indexable parting blade according to claim 1, wherein:

the first, second and third inlets open out to one or both of the blade first and second sides; and each inlet comprises a pair of converging, straight upper inlet-edges, all of which are oriented in the same direction.

21. The indexable parting blade according to claim 1, wherein:

the first channel portion comprises a curved turn preceded by a preceding channel part and succeeded by a succeeding channel part;

a turn cross-sectional area measured perpendicular to the coolant path through the curved turn is greater than a preceding channel part cross-sectional area measured perpendicular to the coolant path through the preceding channel part.

22. The indexable parting blade according to claim 21, wherein the turn cross-sectional area is greater than a succeeding channel part cross-sectional area measured perpendicular to the coolant path through the succeeding channel part.

23. The indexable parting blade according to claim 1, further comprising:

a fourth insert pocket located along the blade peripheral edge; and a fourth coolant channel comprising a fourth inlet, at least one fourth outlet opening out to the fourth insert pocket, and a fourth channel portion extending between the fourth inlet and the at least one fourth outlet.

24. The indexable parting blade according to claim 1, wherein:

in a cross-section of the parting blade taken between the first and second sides, an imaginary radial line (LR) extending from the center axis (A1) to any part of the blade peripheral edge, intersects at least two of the coolant channels.

* * * * *